United States Patent [19]
Green et al.

[11] 3,882,482
[45] May 6, 1975

[54] OPTICAL RADIANT ENERGY ENCODING AND CORRELATING APPARATUS

[75] Inventors: Benjamin W. Green, Achuza, Haifa, Israel; Richard E. Roble, Commack; Irving Roth, Williston Park, both of N.Y.

[73] Assignee: Sperry Rand Corporation, New York, N.Y.

[22] Filed: Sept. 12, 1969

[21] Appl. No.: 862,625

[52] U.S. Cl. ............... 340/347 P; 250/570; 356/152
[51] Int. Cl. ....................... G01b 11/26; G01n 21/30
[58] Field of Search .......... 340/146.2, 146.3 F, 190, 340/174.1 L, 347 P; 178/6 BW, 6.8; 356/152; 250/570

[56] References Cited
UNITED STATES PATENTS
3,216,004  11/1965  Herriot............................ 340/347 P

*Primary Examiner*—Maynard R. Wilbur
*Assistant Examiner*—S. C. Buczinski
*Attorney, Agent, or Firm*—S. C. Yeaton; H. P. Terry

[57] ABSTRACT

Object locating apparatus including receiver optics for focussing optical radiant energy emitted from an object within its field of view onto a rotatable drum having a plurality of pseudo-random coded sections disposed along a continuous loop track, the code pattern in alternate sections being identical while those in adjacent sections are skewed and inverted relative to one another. Rotation of the drum uniquely encodes the radiant energy in accordance with its position thereon and a photodetector converts the encoded energy to an equivalent electrical signal preparatory to correlation with a reference code for a period equal to the time required for two of the drum sections to pass through the field.

12 Claims, 8 Drawing Figures

INVENTORS
BENJAMIN W. GREEN
RICHARD E. ROBLE
IRVING ROTH

BY

ATTORNEY

INVENTORS
BENJAMIN W. GREEN
RICHARD E. ROBLE
IRVING ROTH
BY
S.C. Yeaton
ATTORNEY

OPTICAL RADIANT ENERGY ENCODING AND CORRELATING APPARATUS

BACKGROUND OF THE INVENTION

The present invention relates to optical radiant energy responsive apparatus and more particularly to means for encoding and correlating radiant energy in a manner to produce a correlation signal devoid of residues for the purpose of accurately determining the location of a radiating object within the field of the apparatus.

Various techniques have been developed in the prior art for detecting, locating and imaging objects by responding to the energy radiated from them and for discriminating the objects from their background. A simple lens and photodetector configuration is capable of detecting objects but cannot precisely locate them except by means of a small field system which is scanned over a larger area. Scanning has the disadvantage of reducing the signal-to-noise ratio since the object is only momentarily within the field of the lens. It also increases the probability that a brief flash of energy will not be detected as a result of the lens being directed elsewhere at the instant the flash occurs. Consequently, object locating equipment having a large fixed field of view is generally preferred. Equipment having this characteristic typically utilizes a vidicon, photodetector matrix or coded reticle. Each has its relative advantages and disadvantages. Vidicons are suitable for use in the visible range but have very low sensitivity in the infrared and ultraviolet regions and poor resolution in general. Photodetector matrices, in which leads must be affixed to each detector, are unwieldy to fabricate particularly if high resolution is required thereby necessitating the use of a very large number of extremely small detectors. Moreover, great care must be exercised to select detectors having uniform responsivity so that the matrix does not distort the field. In addition, the matrix is only suitable for use in the wavelength band to which the detectors are responsive.

Coded reticles, on the other hand, are generally used with one or a very small number of photodetectors which therefore can be easily interchanged to accommodate the wave band of interest with good sensitivity. More recently, correlation techniques have been used in conjunction with reticles containing random or pseudo-random codes, the latter being particularly suitable for this purpose. Correlation has the advantage, when properly applied, of significantly improving the signal-to-noise ratio. In one prior art coded reticle system a plurality of pseudo-random codes are arranged such that radiation emitted from an object in the field is uniquely encoded in accordance with the position at which it is focussed on the reticle. The encoded signal is then correlated with the plurality of codes and phase shifted replicas thereof to produce an image of the radiating object. As a result of the cross-correlation, that is, the comparison of the encoded signal with other codes, residues are produced in the correlation output in the form of false images which are usually of lower intensity than the object image. The problem, however, is that it cannot be determined whether the additional images are caused by the correlation process or are in fact the images of additional objects located in the field. In another prior art coded reticle correlation system, the foregoing problem is eliminated by using a single code in a plurality of tracks, the code in each track being shifted with respect to the adjacent tracks by an amount equal to the width of the field of view at the focal plane of the system and a sufficient number of tracks being provided so that a complete code lies within the field. Since only one code is used, cross-correlation residues are eliminated and the ambiguities normally associated with auto-correlation, that is, the comparison of one code with itself and phase shifted replicas thereof, are eliminated as a result of using a pseudo-random code in the prescribed manner. Both of these systems require rather complex encoding mechanisms and comparatively elaborate equipment for performing the necessary data processing.

SUMMARY OF THE INVENTION

The present invention provides for detecting and locating optical radiant energy emitting objects by means of a relatively simple pseudo-random coding technique thereby substantially decreasing the complexity of the associated equipment. It is, however, not capable of discriminating between several objects or forming an image of even a single object and is therefore restricted to applications where it is known that only one object of interest will appear in the field of view at any instant.

In a preferred embodiment of the present invention, designed for locating a flashing object, the field is focussed onto a track on a rotatable drum. The track contains a plurality of contiguous coded sections, each having a plurality of parallel bands disposed along the track, and the dimensions of the individual sections are adjusted to correspond to the area of the focussed field. The same pseudo-random code is formed in each band and in at least every other section the code in each band is shifted with respect to both the adjacent bands in the same section and the collinearly aligned bands of the contiguous sections thereby forming a code pattern in each section which is skewed with respect to the code pattern in the adjacent sections. In addition, the transmissivity of the code bits in each section are inverted with respect to that of the corresponding code bits in the adjacent sections. This arrangement assures that rotation of the drum imparts a unique code to optical energy focussed on the track in accordance with its position thereon. The encoded optical signal is converted to an equivalently encoded electrical signal by means of a photodetector positioned in back of the track and is then applied to a correlator unit, comprising coincidence detectors and integrators, wherein it is compared with a code from a reference generator. The reference code, which is synchronized with the signal code, is the same as the code formed in each band of the coded sections on the drum and is repeated once to produce a code length equal to the length of two code sections so that the correlation period is equal to the time required for two coded sections to pass any given point in the focal plane of the receiver. As each signal bit is generated, it is compared simultaneously with all the reference code bits and for each succeeding bit the reference code is shifted one bit thereby providing the phase shifts required between the signal and reference codes for performing the correlation. As will be explained further hereinafter, additional data processing equipment can be added to achieve background suppression and to provide for locating continuously radiating objects.

DESCRIPTION OF THE PREFERRED EMBODIMENT

Figure 1:
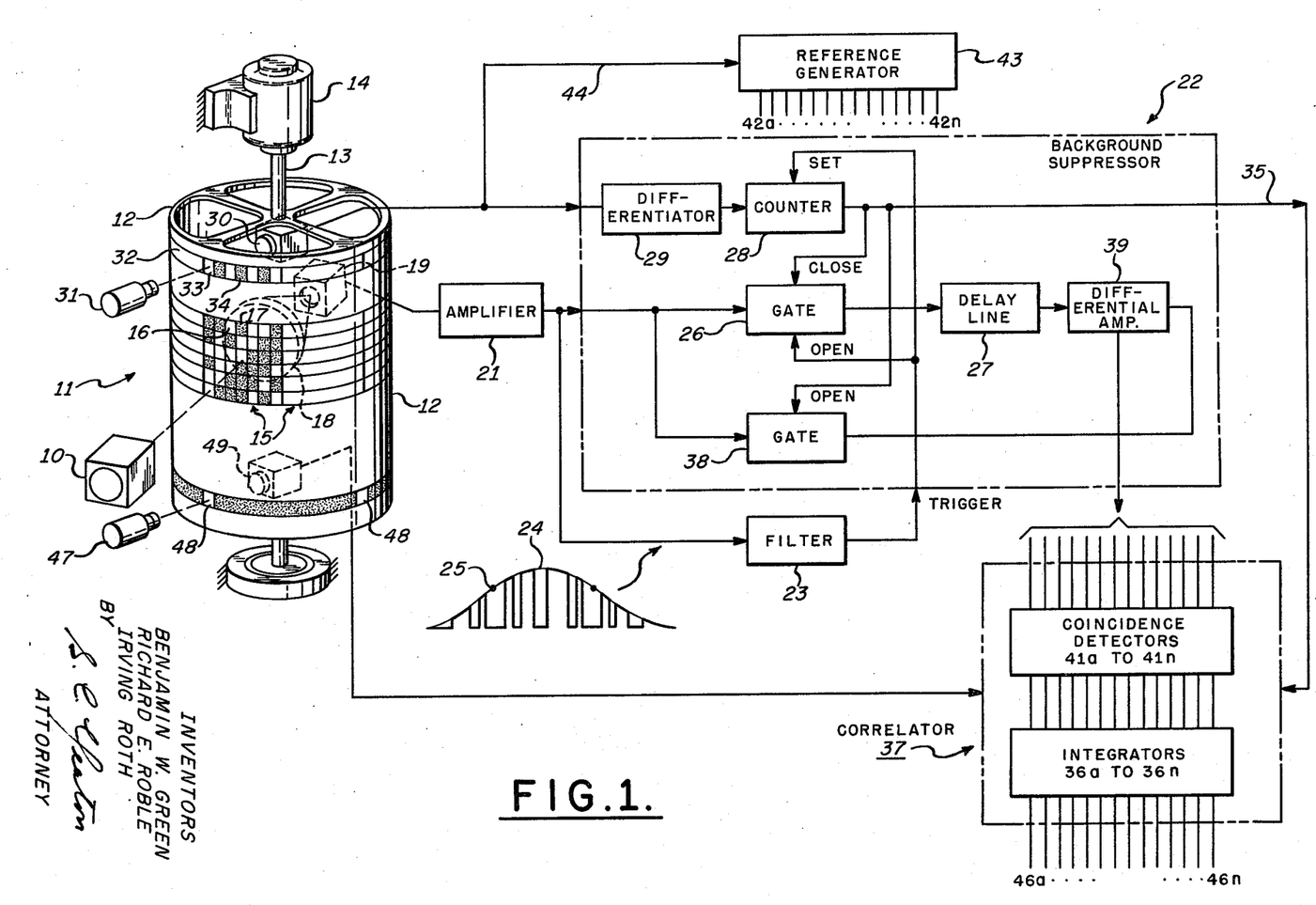
FIG. 1 is a partial perspective drawing of a flash sensor apparatus constructed in accordance with the principles of the present invention.

Referring to FIG. 1, optical radiation propagating through the entrance aperture of receiver optics 10 is focussed onto track 11 on the curved surface of drum 12 which is rotatable about axis 13 by means of motor 14. The areal dimensions of individual coded sections 15 disposed in contiguous relationship around the track are equal to the dimensions of the focussed field of the receiver optics. As will be explained subsequently in greater detail, each coded section includes a pseudo-random code pattern represented by clear and shaded segments 16 and 17 (bits) which are respectively relatively more transparent and opaque to the wavelength of interest, the code patterns of alternate sections being identical while those in adjacent sections are skewed and inverted relative to one another. As the drum rotates, optical radiation focussed on the track is intermittently transmitted therethrough whereupon it is uniquely encoded in accordance with the position at which it intercepts the track which in turn depends upon the location of the radiation emitting object in the field of the receiver. Condenser lens 18 positioned behind the track collects the encoded light and directs it onto photodetector 19 wherein it is converted to an equivalent electrical signal of discrete voltage levels. It will be apparent to those skilled in the art that the condenser lens may be dispensed with in some cases, as for example, where the field of view is sufficiently small so that a photodetector having uniform responsivity over the area of its sensitive surface can be positioned immediately in back of the track.

The encoded signal at the output of the photodetector is applied through amplifier 21 to background suppressor 22 and filter 23. Filter 23 has a low frequency bandpass which is responsive to the envelope 24 of the encoded signal. Thus, if the radiating object in the field is, for instance, an airport beacon flashing on and off with a known rise time and duration, the filter can be made to respond to the slope of the envelope of the encoded signal so as to commence a data processing sequence at the half power point 25 or any other suitable level of the beacon pulses. A level detector can be used in place of the filter but the slope detector is preferred in order to reduce the likelihood of responding to large amplitude noise pulses. In any event, when an optical signal having the appropriate characteristics is received, a trigger signal is provided at the output of the filter for application to background suppressor 22. Upon receiving the trigger signal, gate 26 in the background suppressor opens to permit the amplified encoded signal from photodetector 19 to pass into delay line 27. Simultaneously, counter 28 is set to count synchronizing pulses obtained through differentiator 29 from photodetector 30 which operates in conjunction with light source 31 and synchronizing track 32 containing alternate transparent and opaque segments 33 and 34 having a length equal to that of the pseudo-random code bits. At the end of an encoding period, which corresponds to the time required for a length of track equal to the length of two code sections to traverse the signal radiation focussed thereon, gate 26 is closed by a signal from counter 28 which measures the period by counting the synchronizing pulses. In the case of a seven-bit pseudo-random code, for example, the encoding period contains fourteen bits whereby fifteen pulses are applied to the counter thereby assuring that the count commences at the instant the filter provides a trigger signal irrespective of whether the synchronizing pulses are at their high or low level at that particular instant. Thereafter, fourteen differentiated pulses are counted to mark the end of each successive encoding period. The counter also provides a signal at the end of every period on lead 35 to clear the integrators $36_a$–$36_n$ in correlator 37 in readiness for performing a correlation in a subsequent period.

If the time duration of a flashing pulse is known, the encoding period, as determined by the length of the coded sections and the rotational rate of the drum, can be adjusted to correspond to the length of the pulse. On the other hand, if the length of the flashing pulses is not known, the encoding period is made equal to the separation of two discrete points such as the half power points of a single pulse. In this instance, the encoded signal at the output of photodetector 19 will still contain data relating to the flashing pulse during the next period. In order to discriminate the signal of interest, namely, the flashing pulse, from the background observed by the optical receiver, the information in one encoding period containing only the background exclusive of the signal must be subtracted from the information in another period which contains both the background and the signal. Thus, if it is known that the flashing pulse will continue beyond its second half power point for only a fraction of a period, the signal in delay line 27 need be delayed for only one encoding period before correlation is commenced. Thereafter, gate 38 is opened for one period by a signal from counter 28 to permit the encoded signal from photodetector 19 to be compared in differential amplifier 39 with the encoded signal from delay line 27. A serial comparison of the successive bits in the delayed and instant encoded signals provides a signal at the output of the differential amplifier which contains information relating only to the signal of interest. This assumes, of course, that the background data remains substantially constant for at least several encoding periods and further that balanced gain is maintained for the signals applied to both input terminals of the differential amplifier.

The series of pulses at the output of the differential amplifier are applied in parallel to coincidence detectors $41_a$ to $41_n$ in correlator 37 wherein they are compared with the reference code pulses obtained on leads $42_a$ to $42_n$ from reference code generator 43 which is synchronized with the encoded signals by means of the synchronizing pulses applied thereto on lead 44 from photodetector 30. The coincidence detectors produce positive pulses when the reference and signal bits are of the same polarity and negative pulses when the reference and signal bits are of opposite polarity. The output pulses of the respective coincidence detectors are applied to associated integrators which sum the signals applied thereto and provide a correlation signal on output terminals $46_a$ to $46_n$ which connect to readout devices (not shown).

For applications where it is known that the radiating object will appear against a uniform background, the delay and subtract functions of the background suppressor can be eliminated and the encoded signal at the output of photodetector 19 can be fed directly to the correlator for comparison with the reference code. The encoding and correlating apparatus can also be used for applications in which the energy emitted from a radiating object of interest is fairly uniform for several or more encoding periods. In this case, the background suppressor will not be needed if the background is uniform, and the filter will not be required since a correlation sequence can be initiated at any arbitrary point such as the beginning of a coded section. This can be accomplished for instance, by means of a light source 47, a transparent segment 48 aligned with a coded section on the drum and a photodetector 49 where the signal at the output of the photodetector is utilized to control commencement of the correlation period. On the other hand, if the background is non-uniform, it will be possible to discriminate a signal which lasts for several or more code periods only if it changes somewhat in intensity during the time it exists. Then, if the background remains constant, subtraction of the information in a subsequent period from the information in an earlier one will completely cancel the background but only partially cancel the signal. It should also be noted that in the case of continuously radiating objects only two coded sections are required in the encoding track.

Figure 2:
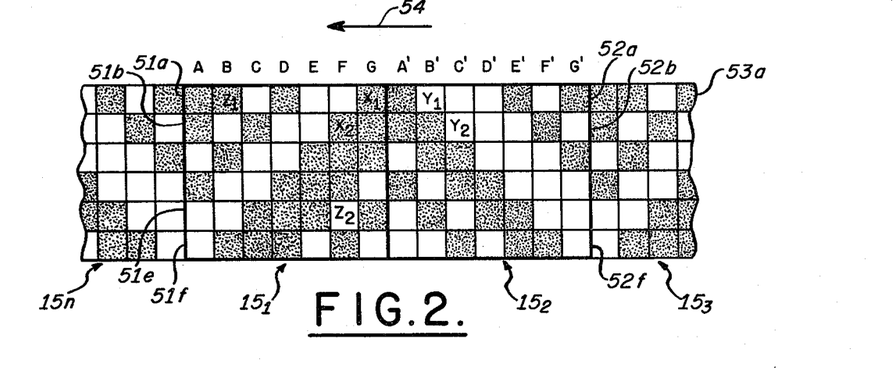
FIG. 2 is a pictorial representation of adjacent coded sections used in the flash sensor apparatus of FIG. 1.

For a more thorough description of the correlation process, reference should now be made to FIG. 2 wherein two coded sections $15_1$ and $15_2$ each comprise a plurality of bands $51_a$ to $51_f$ and $52_a$ to $52_f$, respectively, running in the direction of track 11 with the corresponding bands being collinearly aligned. The same pseudo-random code is formed in each band of both sections by means of clear and shaded segments which are relatively more transparent (+) and opaque (−) respectively to optical radiant energy lying in the waveband of interest. A seven-bit code is illustrated for simplicity of description but it should be understood that the code length will be selected in accordance with the resolution and field of view that is required. The illustrated code is of the form − − − + − + + but as indicated, the code in band $51_a$ is shifted to the left by one bit so that the code has the designated form beginning at lateral resolution element G and continuing in elements A through F. Likewise, the code in band $51_b$ has been shifted to the left by two bits so that the code has the designated form beginning at lateral resolution element F and continuing first in element G and then elements A through E. The code in each band of section $15_2$ is the inverse of the code in section $15_1$ and therefore has the form + + + − + − −. In band $52_a$, corresponding to band $51_a$ of section $15_1$, the code is shifted one bit to the right so it has the indicated form beginning at lateral resolution element B' and continuing first through element G' and ending in element A'. Likewise, the code in band $52_b$ is shifted two bits to the right and so on with the code in each band being shifted successively one bit to the right. Thus, the code patterns in adjacent sections are skewed relative to one another whereby corresponding code segments are located at different lateral resolution elements. In addition, the corresponding code segments are inverted, code segments $X_1$ and $X_2$ in section $15_1$ for instance, being opaque while segments $Y_1$ and $Y_2$ in section $15_2$ are transparent. These features are also incorporated in the other code embodiments that will be described hereinafter.

If the field of view of the receiver optics is focussed on section $15_1$ at the instant that the trigger signal is derived from filter 23 and the radiation from an object of interest is focussed on resolution element G of code band $51_a$, the encoding period will begin at that time and continue as code band $52_a$ in section $15_2$ and the first six bits of code band $53_a$ in section $15_3$ move past resolution element G in the direction of arrow 54. The code pattern in section $15_3$ is identical to that in section $15_1$ so each encoding period always includes two phase shifted replicas of the code, one being inverted with respect to the other, irrespective of both the position of the signal radiation on the coded sections and the instant that it appears thereon. Likewise, since the code patterns in alternate sections are identical, section $15_n$, representing the $n^{th}$ or last coded section, is the same as section $15_2$.

Now consider the details of a correlation sequence for the case where the signal energy is incident on resolution element A in code band $51_a$ and the field is focussed on section $15_1$ at the instant the encoding period of interest begins. Then, if the background is uniform, the signal code provided at the output of photodetector 19 will be of the form $$- - + - + + - - + + + - + -$$

as sections $15_1$ and $15_2$ traverse the field. As mentioned previously, correlation of the signal code with the reference code would generally be delayed until a few periods after the encoding period but for simplicity of understanding assume that the correlation is performed immediately as the signal code is generated as could be done for a uniform background inasmuch as a background suppressor would not be required. The reference code is of the form $$- - - + - + + - - - + - + +$$

at the instant section $15_1$ is completely within the field of the receiver optics. This code is simply a repetition of the code which is formed with different phase shifts in each band of one set of alternate sections on the drum. As each signal bit is generated, it is compared in the coincidence detectors with the reference code bits which are produced simultaneously at the fourteen output terminals of the reference generator. For each succeeding signal code bit, however, the reference code is shifted one bit before the comparison is made in order to provide the plurality of phase shifts required to correlate signal and reference codes. The respective coincidence detectors provide voltage pulses at their output terminals of either positive or negative polarity depending upon whether the polarities of the signal and reference code bits are identical or opposite. If an equal number of positive and negative pulses are produced at a detector output, the corresponding integrator output is zero. On the other hand, if the number of positive and negative pulses at the output of a given detector are unequal, the integrator output assumes a finite value proportional to the difference therebetween. When the first signal code bit is generated and compared with the reference code bits, the voltage pulses at the output of the fourteen coincidence detectors are respectively

Figure 3:
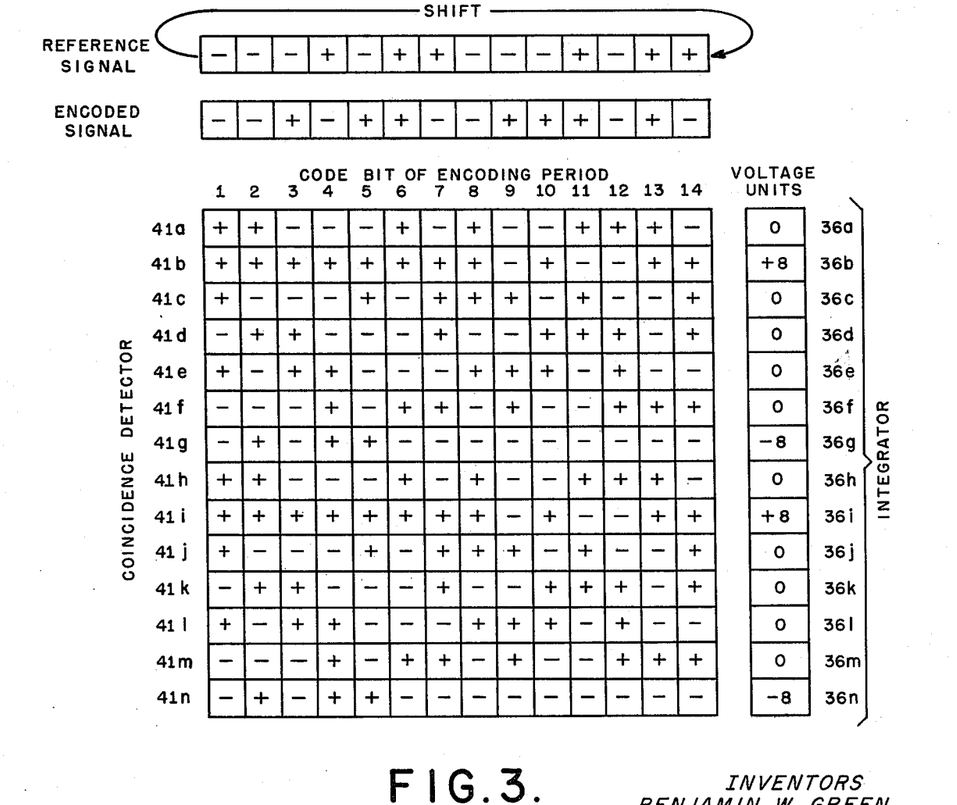
FIG. 3 is a table indicating the signal amplitude at the output of the coincidence detectors and associated integrators used in the correlator of the flash sensor for discrete positions of the code pattern of FIG. 2 relative to the field of the sensor when optical radiation is incident on a predetermined position of the coded sections.

+ + + − + − − + + + − + − − as indicated in column 1 of FIG. 3. After the drum has rotated to position code bit $Z_1$ of band $51_a$ in the path of the signal radiation, another negative signal bit is generated for comparison with the reference code which is now shifted forward one bit so that the code at the fourteen output terminals of the reference generator becomes

− − + − + + − − − + − + + −

The pulses at the output terminals of the respective coincidence detectors are now

+ + − + − − + + + − + − − + as shown in column 2 of FIG. 3. This procedure is continued for each successive signal code bit to produce voltage pulses at the output of the coincidence detectors as indicated in the respective columns of the figure. Thus, at the end of one encoding period, integrators $36_b$ and $36_g$ in the first group of seven integrators have respectively +8 and −8 voltage units at their output terminals while the voltage output of the other integrators is zero. Likewise, in the second group of integrators ($36_h$ to $36_n$), the corresponding integrators, namely, $36_i$ and $36_n$ also have respectively +8 and −8 voltage units at their output terminals while the voltage output of the others is zero. Hence, the second group of integrators is redundant and need be used only for the purpose of verification since the first group uniquely defines the location of the radiating object in the field. Therefore, the radiating object focussed on resolution element A is characterized by the + and − voltages at the output of integrators $36_b$ and $36_g$.

Figure 4:
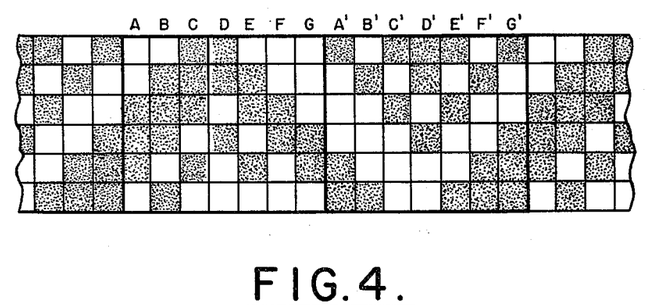
FIG. 4 depicts the code pattern of FIG. 2 shifted with respect to the field of the optical receiver of the flash sensor.

Now assume that the radiating object is once again located in the field at a position which results in it being focussed on resolution element A in code band $51_a$ but further assume that the correlation period does not commence until such time as the coded sections are positioned as indicated in FIG. 4 where the code sections are shifted four segments to the left compared to the positions shown in FIG. 2. The signal code in this instance is

Figure 5:
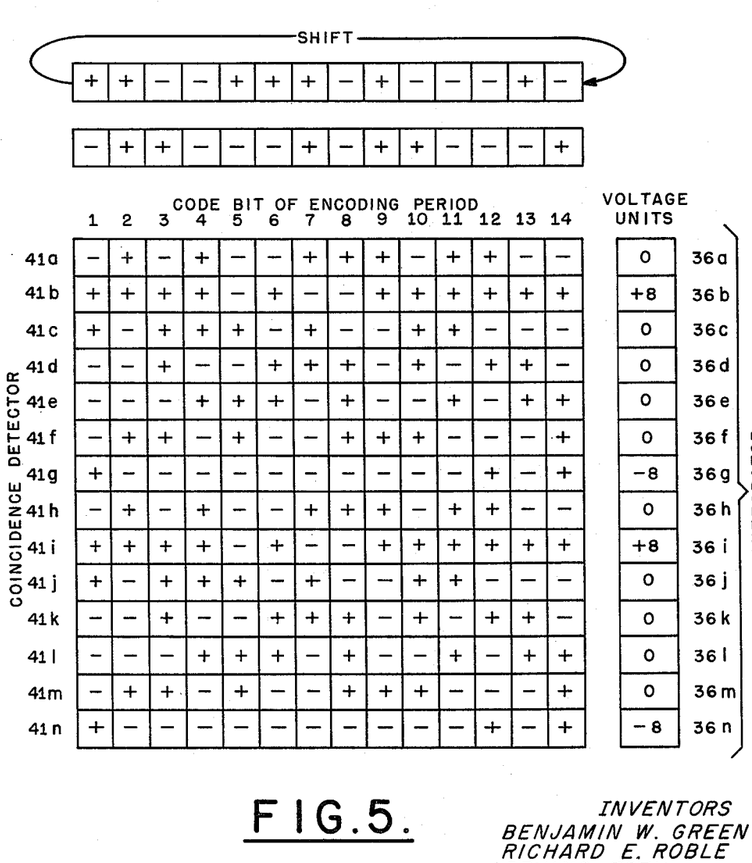
FIG. 5 is a table indicating the signal amplitude at the output of the various detectors and associated integrators for discrete positions of the code pattern of FIG. 4 relative to the field of the sensor when optical radiation is incident thereon at the predetermined position.

+ + − − + + + − + − − − + − and, since the reference code shifts one bit as the signal code moves across each lateral resolution element, the reference code is − + + − − − + − + + − − − + The coincidence detector and integrator output signals for this situation are depicted in FIG. 5 where once again integrators $36_b$ and $36_g$ have output signals of +8 and −8 voltage units, respectively, indicating that the object is focussed as assumed.

The same conditions obtain for any position in the field, that is, corresponding integrators in the first and second groups provide respective + and − output voltages and a pair of integrators in each group uniquely represent the location of an object in the field. Thus, for an object focussed in resolution element A of band $51_e$ where the encoding period commences at the instant code bit $Z_2$ (see FIG. 2) is at the left side of the field, the signal code generated during the correlation period is

+ − + − + − − + + + + − − −

The reference code generated during this period is

+ + − − − + − + + − − − + −

Figure 6:
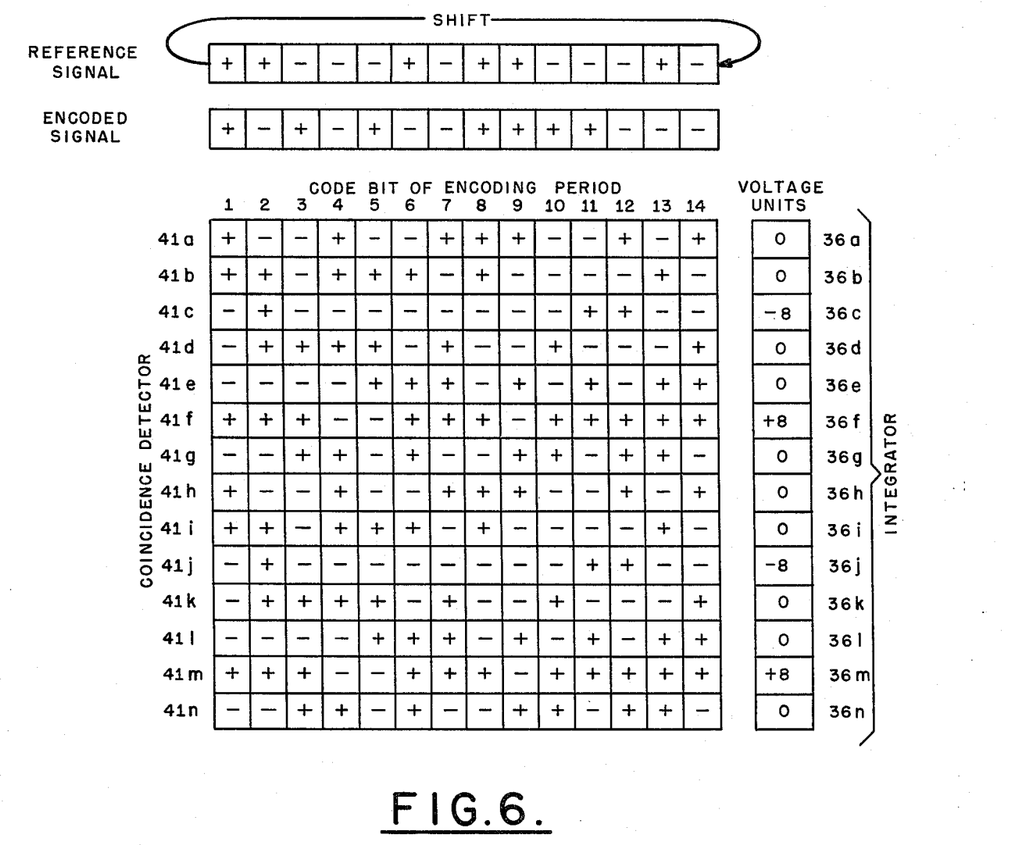
FIG. 6 is a table indicating the signal amplitude at the output of the various detectors and associated integrators when optical radiation is incident at a different position on the coded sections of FIG. 2.

The coincidence detector and integrator output signals produced for this condition are depicted in FIG. 6 which indicates that an object located in resolution element A of band $51_e$ is identified by +8 and −8 voltage units at the output of integrators $36_c$ and $36_f$ or alternatively $36_j$ and $36_m$ in the redundant group.

Figure 7:
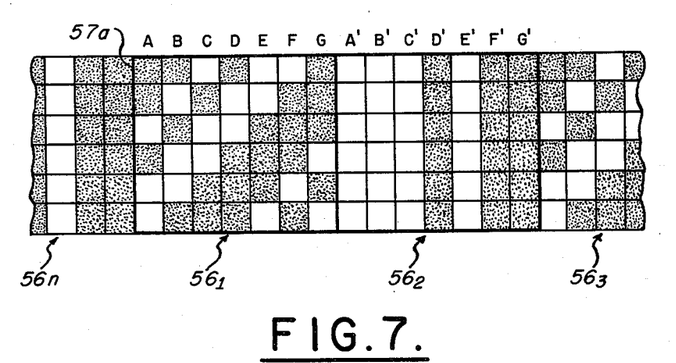
FIG. 7 depicts an alternative code pattern which is also suitable for use in the flash sensor.

It should be understood that the code segments of the skewed code patterns can also be formed by lineal, diagonally oriented bars of alternating transparency and opacity. Moreover, it is not necessary for the code to be skewed in all sections. The essential requirement is that the code pattern in at least every other section must be skewed with respect to the track but in the remaining sections the code in the individual bands may be in phase with one another, as indicated in FIG. 7 wherein the code patterns in sections $56_1$ and $56_3$ are skewed while those in sections $56_2$ and $56_n$ are straight. In this case, if a radiating object appearing against a uniform background is focussed on lateral resolution element A in band $57_a$ and the correlation period begins when the field is focussed on section $56_1$, the signal code that is generated is

− − + − + + − + + + − + − − and once again if the reference code is

Figure 8:
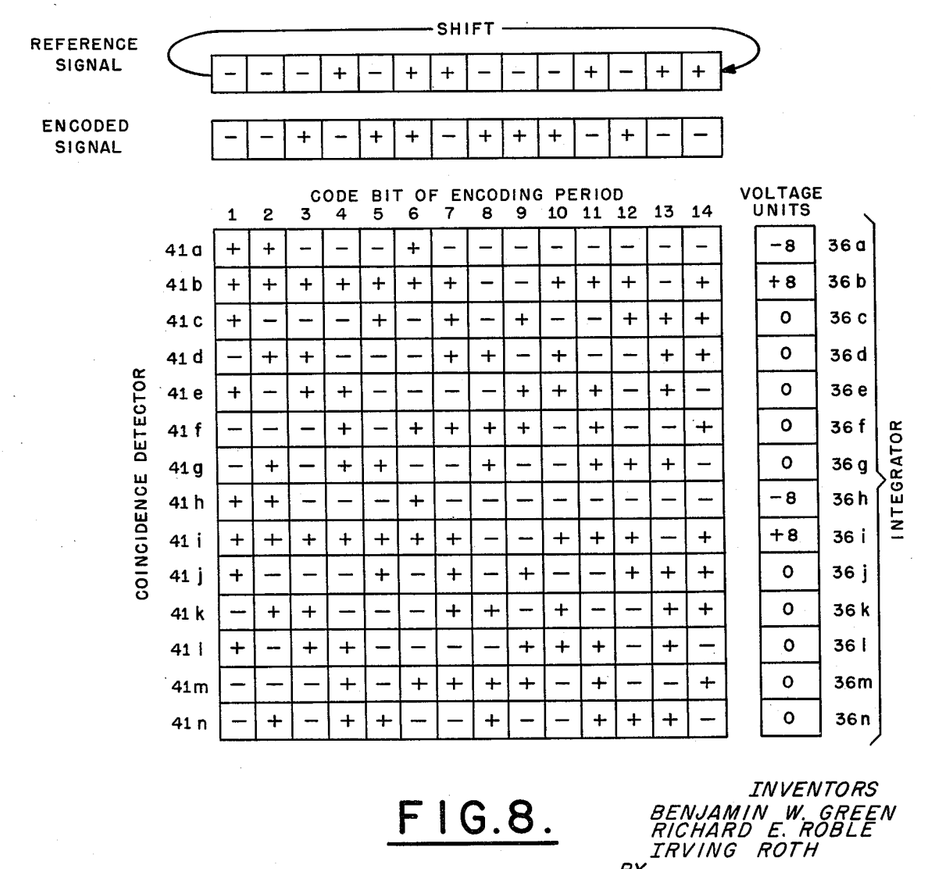
FIG. 8 is a table indicating the signal amplitude at the output of the various detectors and associated integrators for discrete positions of the code pattern of FIG. 7 relative to the field of the sensor when optical radiation is incident thereon at a predetermined position.

− − − + − + + − − − + − + + then the coincidence detector and integrator signals are as indicated in FIG. 8. For this arrangement of the code patterns, an object focussed on resolution element A in band $57_a$ is identified by +8 and −8 voltage unit signals at the output of integrators $36_a$ and $36_b$ or $36_h$ and $36_i$. It is therefore seen that as the code patterns are varied, different integrators are representative of objects focussed in the respective resolution elements. Hence, it is necessary to determine beforehand which integrator pairs represent the various resolution elements for given code patterns.

In any case, the signal code in one-half of the encoding period must not be equal and opposite to that in the other half. It will be readily appreciated that if this condition existed, the voltage output of all the integrators would be zero and there would be no indication that an object was present in the field. This is the reason why the number of segments in each row oriented normal to the direction of the track must be at least one less than the number of segments extending along the track in each coded section. Moreover, it is not necessary for the shift to be uniform from band to band in a given coded section. It is only required that the code in collinearly aligned bands of adjacent sections be shifted by different amounts within their respective sections in order to avoid ambiguity.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An optical encoder comprising
a member having a continuous loop track including at least two coded sections each having a plurality of bands disposed along the track with each band containing the same pseudo-random code formed by means of segments respectively relatively more transparent and opaque to optical radiant energy, the transmissivity of the code segments in one section being inverted with respect to the corresponding code segments in the other section and the codes in the bands of at least one of the sections being shifted relative to one another whereby the code patterns of the respective sections are skewed relative to one another.

2. The apparatus of claim 1 wherein corresponding code segments in each band of the respective sections are located at different relative positions within the sections.

3. The apparatus of claim 1 wherein the code in each band of one section is shifted with respect to the code in respective collinearly aligned bands of the other section and the number of bands in each section is at least one less than the number of segments in the code.

4. The apparatus of claim 2 wherein the code in each band of one coded section is shifted by a different discrete amount in one direction along the track with respect to the code in one of the bands in said one code section and the codes in the corresponding bands of the other section are shifted by similar amounts in the opposite direction along the track.

5. The apparatus of claim 2 wherein the continuous loop track includes additional coded sections disposed in contiguous relationship around the track and the code patterns are identical in alternate sections.

6. The apparatus of claim 5 further comprising
optical means positioned adjacent said member for focussing energy radiated from an object in its field of view onto the continuous loop track within an area equal to the areal dimensions of a coded section,
means for moving said member such that the coded sections successively pass through the focal plane of the optical means to encode the energy incident thereon with a period equal to the length of time required for two coded sections to pass therethrough, and
a photodetector positioned relative to said member to receive the encoded energy transmitted through the coded sections and convert it to an equivalent encoded electrical signal.

7. The apparatus of claim 6 further comprising a condenser lens positioned intermediate the coded sections and the photodetector to collect the encoded energy and direct it onto the photodetector.

8. The apparatus of claim 6 in combination with
a reference code generator for prepetitively generating a reference code which is an electrical phase shifted replica of the pseudo-random code formed in each band of one set of the alternate coded sections, and
means for correlating the reference code and the encoded electrical signal.

9. The apparatus of claim 8 wherein the correlation period is equal to the period of the encoded electrical signal and the reference code generator comprises means for shifting the reference code one bit in a prescribed direction as each bit of the encoded signal is generated, and further including means for synchronizing the reference code with the encoded signal.

10. The apparatus of claim 9 wherein the correlating means includes a plurality of coincidence detectors and a plurality of integrators, each integrator being connected to the output terminals of a corresponding coincidence detector which operates to determine similarity and dissimilarity of the synchronous reference code and encoded electrical signal bits applied to its input terminals and the totality of coincidence detectors being equal in number to the number of code segments in each band of a coded section.

11. The apparatus of claim 9 and further including means for delaying for at least one encoding period the encoded electrical signal generated during one period, and
means for subtractively combining the delayed encoded electrical signal and the encoded electrical signal generated during a subsequent period.

12. The apparatus of claim 11 and further including a filter responsive to the slope of the leading edge of the envelope of the encoded electrical signal for providing a trigger signal to actuate the delay means.

* * * * *